United States Patent
Tamano

(10) Patent No.: US 11,968,759 B2
(45) Date of Patent: Apr. 23, 2024

(54) DIMMING DATA TRANSMISSION DEVICE

(71) Applicant: Rohm Co., Ltd., Kyoto (JP)

(72) Inventor: Yasuhiro Tamano, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 17/927,127

(22) PCT Filed: Apr. 19, 2021

(86) PCT No.: PCT/JP2021/015799
§ 371 (c)(1),
(2) Date: Nov. 22, 2022

(87) PCT Pub. No.: WO2021/241066
PCT Pub. Date: Dec. 2, 2021

(65) Prior Publication Data
US 2023/0209687 A1   Jun. 29, 2023

(30) Foreign Application Priority Data
May 29, 2020   (JP) ................. 2020-094283

(51) Int. Cl.
*H05B 47/11* (2020.01)
*B60K 35/00* (2006.01)
*G09G 3/34* (2006.01)
*H05B 45/10* (2020.01)

(52) U.S. Cl.
CPC .............. *H05B 47/11* (2020.01); *B60K 35/00* (2013.01); *G09G 3/3426* (2013.01); *H05B 45/10* (2020.01); *B60K 2370/1529* (2019.05); *G09G 2320/0626* (2013.01)

(58) Field of Classification Search
CPC ......... G09G 2320/0626; G09G 3/3426; G09G 2320/0646; G09G 2380/10; H05B 45/10; H05B 47/11; H05B 47/18; B60K 2370/1529; B60K 35/00
See application file for complete search history.

(56) References Cited

U.S. PATENT DOCUMENTS 10,558,066 B2 *   2/2020   Ishizaka ................. B60J 3/04
2018/0203226 A1 *   7/2018   Tomioka ............... G06F 3/1431

FOREIGN PATENT DOCUMENTS

| JP | 2007172006 A | * | 7/2007 | |
| JP | 2012078699 | | 4/2012 | |
| JP | 2012078699 A | * | 4/2012 | |
| JP | 2016025090 | | 2/2016 | |
| JP | 2017035980 | | 2/2017 | |
| WO | WO 2019106829 | | 6/2019 | |
| WO | WO-2019106829 A1 | * | 6/2019 | ........... G09G 3/20 |

OTHER PUBLICATIONS

International Search Report in International Appln. No. PCT/JP2021/015799, dated Jun. 15, 2021, 5 pages.

* cited by examiner

*Primary Examiner* — Kenneth Bukowski
(74) *Attorney, Agent, or Firm* — Fish & Richardson P.C.

(57) ABSTRACT

A dimming data transmission device includes a determination unit configured to determine whether each of a plurality of divided regions, into which a lightable region of an illumination device is divided, is a light-on region or a light-off region, and a transmission unit configured to transmit dimming data to dim only such a divided region of the divided regions as is serving as the light-on region.

9 Claims, 12 Drawing Sheets

DIMMING DATA TRANSMISSION DEVICE

TECHNICAL FIELD

The invention disclosed herein relates to a method of dimming and transmission of dimming data.

BACKGROUND ART

As a configuration example of an image display system including a plurality of display devices, a configuration is known in which a single control device transmits an image signal to each of a plurality of display devices (see, for example, Patent Document 1 identified below).

CITATION LIST

Patent Literature

Patent Document 1: Japanese unexamined patent application publication No. 2017-35980

SUMMARY OF INVENTION

Technical Problem

For example, in a case where the display devices are liquid crystal display devices, each display device includes a liquid crystal display panel and a backlight unit. In the case where, as described above, a single control device performs dimming control of the backlight unit, the single control device needs to transmit dimming data. Here, for example, by adopting a local dimming control as the dimming control in the liquid crystal display device, it is possible to achieve an improved contrast ratio of an image displayed by the liquid crystal display device.

Unfortunately, however, with the local dimming control, it is necessary to address the increase of the data amount of dimming data.

Solution to Problem

According to one aspect of what is disclosed herein, a dimming data transmission device includes a determination unit configured to determine whether each of a plurality of divided regions, into which a lightable region of an illumination device is divided, is a light-on region or a light-off region, and a transmission unit configured to transmit dimming data to dim only such a divided region of the divided regions as is serving as the light-on region.

According to another aspect of what is disclosed herein, an image display system includes an image signal transmission device including the above-configured dimming data transmission device in which the illumination device is a backlight unit of a liquid crystal display device and configured to transmit dimming data and an image signal, an image signal reception device configured to receive the dimming data and the image signal transmitted from the image signal transmission device, a liquid crystal display panel, and a backlight unit configured to irradiate the liquid crystal display panel with light. Here, the liquid crystal display panel is configured to display an image based on the image signal received by the image signal reception device, and the backlight unit is configured to emit light based on the dimming data received by the image signal reception device.

According to still another aspect of what is disclosed herein, a vehicle includes the above-configured dimming data transmission device or the above-configured image display system.

Advantageous Effects of the Invention

With a dimming data transmission device disclosed herein, it is possible to significantly reduce the data amount of dimming data.

DESCRIPTION OF EMBODIMENTS

First Embodiment

Figure 1:
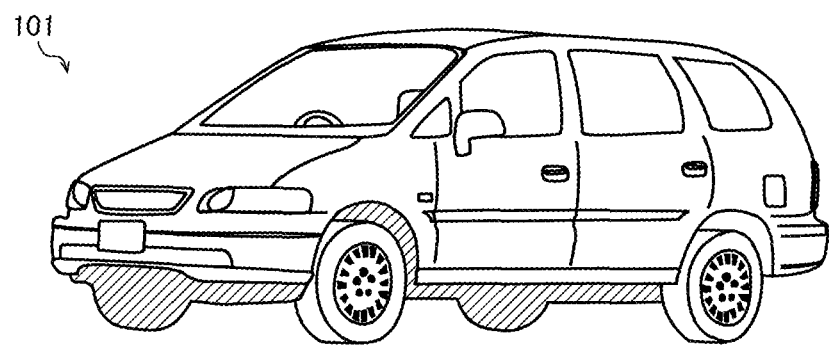
FIG. 1 is an exterior view of a vehicle.
Figure 2:
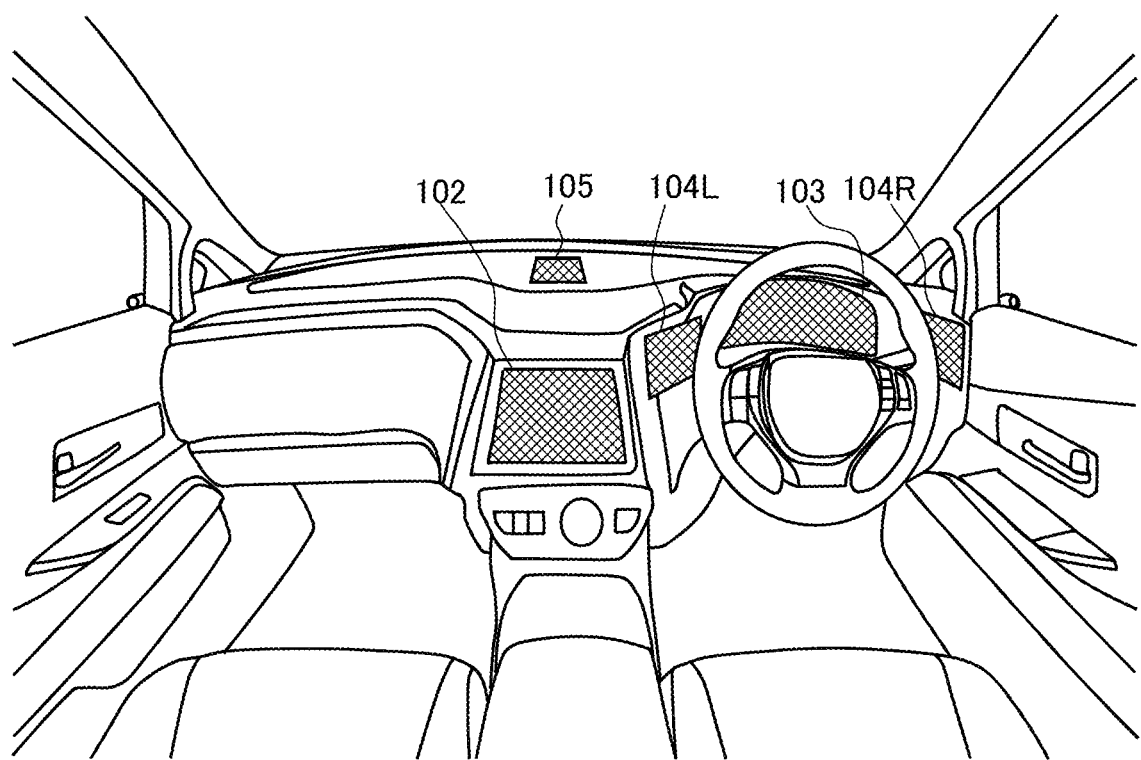
FIG. 2 is a diagram showing an interior of a vehicle.

An image display system 1A according to a first embodiment (hereinafter abbreviated as "the image display system 1A"), details of which will be described later, is mounted on a vehicle 101 shown in FIG. 1, for example. In the case where the image display system 1A is mounted on the vehicle 101 shown in FIG. 1, the image display system 1A includes at least part of the following for example: a center information display (CID) 102 that performs car-navigation map display and so on; an instrument cluster 103; display devices 104L and 104R of an electronic side mirror system; and a head-up display (HUD) 105 (see FIG. 2). Note that the instrument cluster 103 may include a single liquid crystal display device that performs display regarding a plurality of measuring instruments, or may include a plurality of liquid crystal display devices, each of which performs display regarding at least one measuring instrument. The HUD 105 projects, onto the windshield of the vehicle 101, an image displayed by a liquid crystal display device in the HUD 105, and thereby displays a virtual image to a driver of the vehicle 101.

The following description, for simplicity, will deal with an example where the image display system 1A includes one liquid crystal display device 4.

Figure 3:
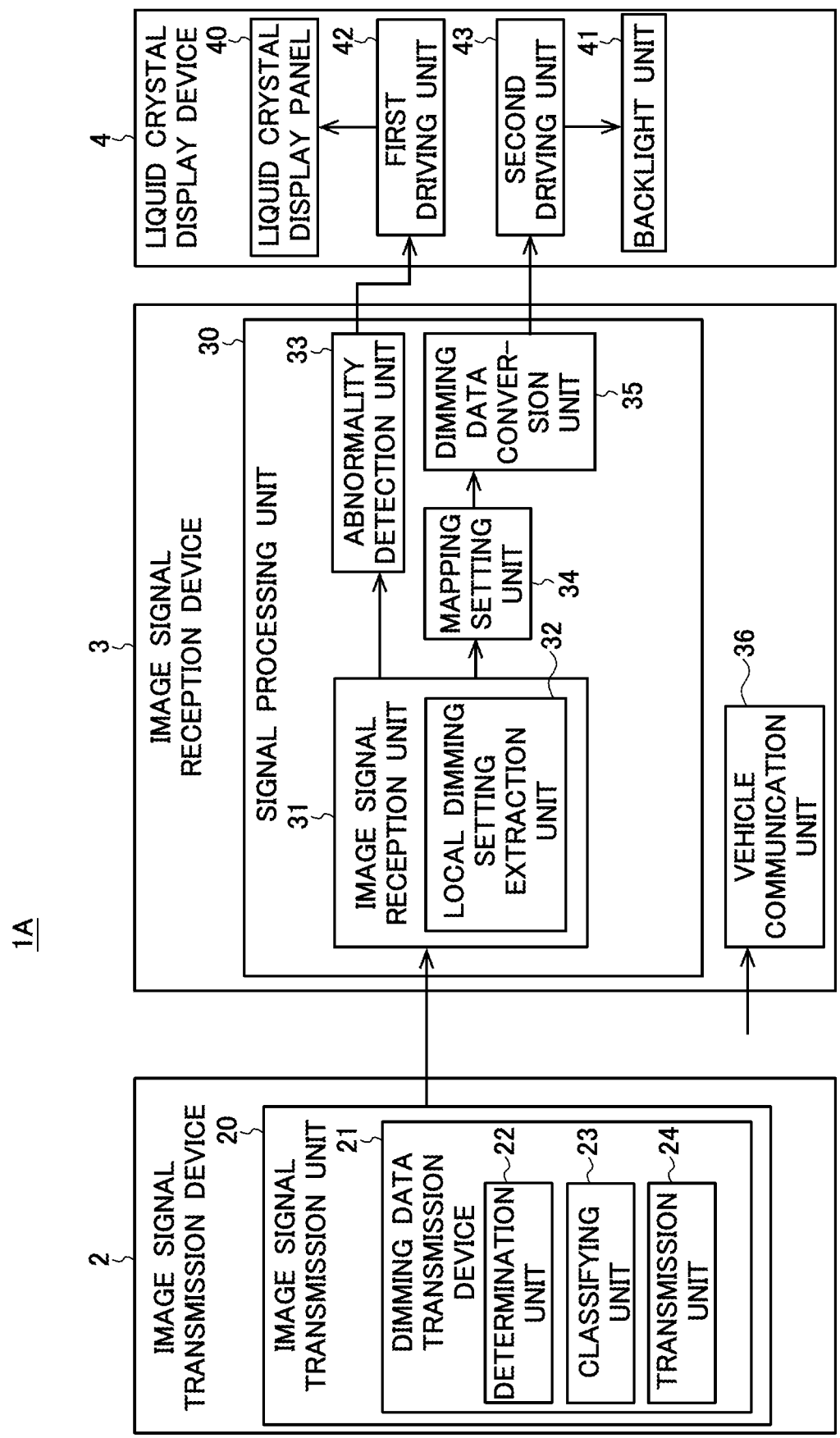
FIG. 3 is a block diagram showing a configuration of an image display system according to a first embodiment.

FIG. 3 is a block diagram showing a configuration of the image display system 1A. The image display system 1A includes an image signal transmission device 2, an image signal reception device 3, and the liquid crystal display device 4.

The image signal transmission device 2 transmits dimming data and an image signal to the image signal reception device 3. The image signal transmission device 2 includes an image signal transmission unit 20. In this embodiment, the image signal transmission unit 20 includes a dimming data transmission device 21. Note that, unlike this embodiment, the image signal transmission unit 20 and the dimming data transmission device 21 may be separately provided. The dimming data transmission device 21 includes a determination unit 22, a classifying unit 23, and a transmission unit 24.

The determination unit 22 determines whether each of a plurality of divided regions, into which a lightable region of a backlight unit 41 is divided, is a light-on region or a light-off region. The backlight unit 41 is a direct backlight unit provided in the liquid crystal display device 4. A later-described second driving unit 43, according to dimming data, turns on only such a light emitting diode (LED) as belongs to the light-on region of the backlight unit 41. With this configuration, it is possible to achieve an improved contrast ratio of a display image of the liquid crystal display device 4.

Figure 4A:
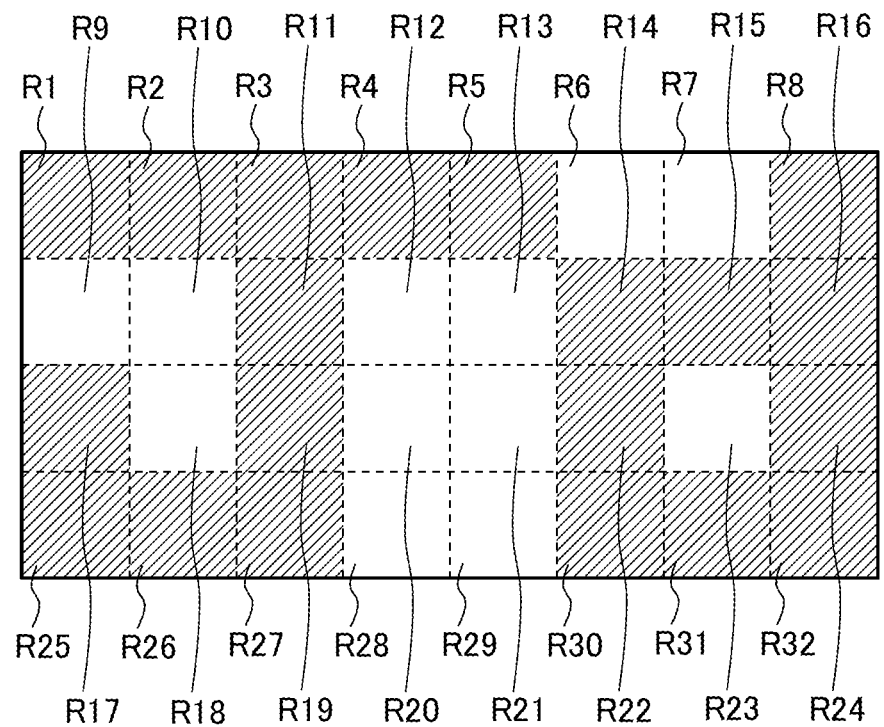
FIG. 4A is a diagram showing an example of a fixed pattern.
Figure 4B:
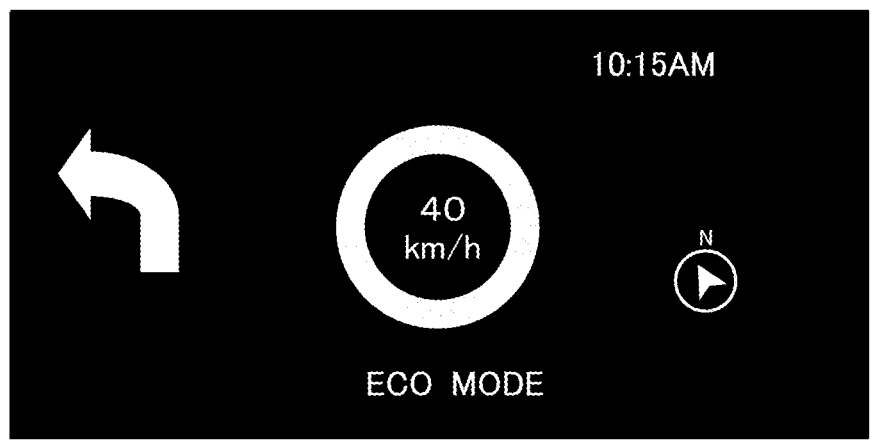
FIG. 4B is a diagram showing an example of a display image.

In this embodiment, the lightable region (the backlight front face) of the backlight unit 41 is, as shown in FIG. 4A, divided into 32 divided regions R1 to R32 in a matrix pattern. In the example shown in FIG. 4A, the determiner 22 has determined that the divided regions R1 to R5, R8, R11, R14 to R17, R19, R22, R24 to R27, and R30 to R32 are light-on regions, and the divided regions R6 to R7, R9 to R10, R12 to R13, R18, R20 to R21, R23, and R28 to R29 are light-off regions. The result of determination by the determination unit 22 is referred to as a fixed pattern. The fixed pattern shown in FIG. 4A is suitable for the display image shown in FIG. 4B, for example. Note that, although the number of divided regions in the above description is 32 for simplicity of the figure, it is actually desirable that the number be on the order of 100 to 6000, for example.

The classifying unit 23 classifies all such divided regions as have been determined to be light-on regions into a number of groups, the number being smaller than a number of all such divided regions as have been determined to be light-on regions. As an example of the classification, the classifying unit 23, in the example shown in FIG. 4A, may classify the divided regions R6 and R7 into a first group, the divided regions R9, R10, and R18 into a second group, the divided regions R12, R13, R20, R21, R28, and R29 into a third group, and the divided region R23 into a fourth group. In the above classification example, such light-on regions as are adjacent to each other at least either horizontally or vertically together form a group. As another example of the classification, the classifying unit 23, in the example shown in FIG. 4A, may classify the divided regions R6, R7, R9, R10, R12, R13, R18, R20, R21, R23, R28, and R29 into one group.

The following description will deal with a case where the fixed pattern is as in the example shown in FIG. 4A and the number of groups classified by the classifying unit 23 is one.

In this embodiment, dimming data is data that allows dimming to be performed individually on a group-by-group basis. Accordingly, the smaller the number of groups is, the more the data amount of dimming data can be reduced. Note that another configuration may be adopted in which, unlike this embodiment, the dimming data transmission device 21 does not include the classifying unit 23. In that case, dimming data is data that allows dimming to be performed individually on a one-by-one basis of the light-on regions.

The transmission unit 24 transmits dimming data for dimming only a divided region serving as a light-on region. In other words, the dimming data does not include any data for dimming a divided region serving as a light-off region. Accordingly, the data amount of dimming data can be reduced.

The image signal reception device 3 receives dimming data and an image signal from the image signal transmission device 2. The image signal reception device 3 includes a signal processing unit 30 and a vehicle communication unit 36. The signal processing unit 30 includes an image signal reception unit 31, an abnormality detection unit 33, a mapping setting unit 34, and a dimming data conversion unit 35. The image signal reception unit 31 includes a local dimming setting extraction unit 32.

The signal processing unit 30 may use, for example, a timing controller, a low voltage differential signaling (LVDS) bridge integrated circuit (IC), a video large scale integration (LSI), etc.

The image signal reception unit 31 receives an image signal transmitted from the image signal transmission device 2. In this embodiment, the image signal reception unit 31 also receives fixed pattern information and dimming data which are transmitted from the image signal transmission device 2.

The local dimming setting extraction unit 32 extracts local dimming setting (the fixed pattern information and the dimming data) from the signal and so on transmitted from the image signal transmission device 2.

The abnormality detection unit 33 detects an abnormality in image data output from the image signal reception unit 31. If no abnormality is detected in the image data, the abnormality detection unit 33 outputs the image data to a first driving unit 42 of the liquid crystal display device 4.

The mapping setting unit 34 performs mapping of the dimming data extracted by the local dimming setting extraction unit 32 onto a light-on region or light-on regions specified by the fixed pattern information.

The dimming data conversion unit 35 adds, to an output of the mapping setting unit 34, dimming data corresponding to a light-off region or light-off regions of the backlight unit 41, and thereby converts the output of the mapping setting unit 34 into dimming data to be output to the liquid crystal display device 4. The dimming data conversion unit 35 outputs the converted dimming data to the second driving unit 43 of the liquid crystal display device 4.

The vehicle communication unit 36, via an in-vehicle communication network, such as Local Interconnect Network (LIN), Controller Area Network (CAN), Media Oriented Systems Transport (MOST), Cock Extension Peripheral Interface (CXPI), or Ethernet, performs communication of various kinds of information with other components (including the image signal transmission device 2) mounted in the same vehicle.

The liquid crystal display device 4 includes a liquid crystal display panel 40, the backlight unit 41 which irradiates the liquid crystal display panel 40 with light, the first driving unit 42 which drives the liquid crystal display panel 40, and the second driving unit 43 which drives the backlight unit 41. The liquid crystal display panel 40 displays an image based on an image signal received by the image signal reception device 3. The backlight unit 41 emits light based on dimming data received by the image signal reception device 3.

Figure 5:
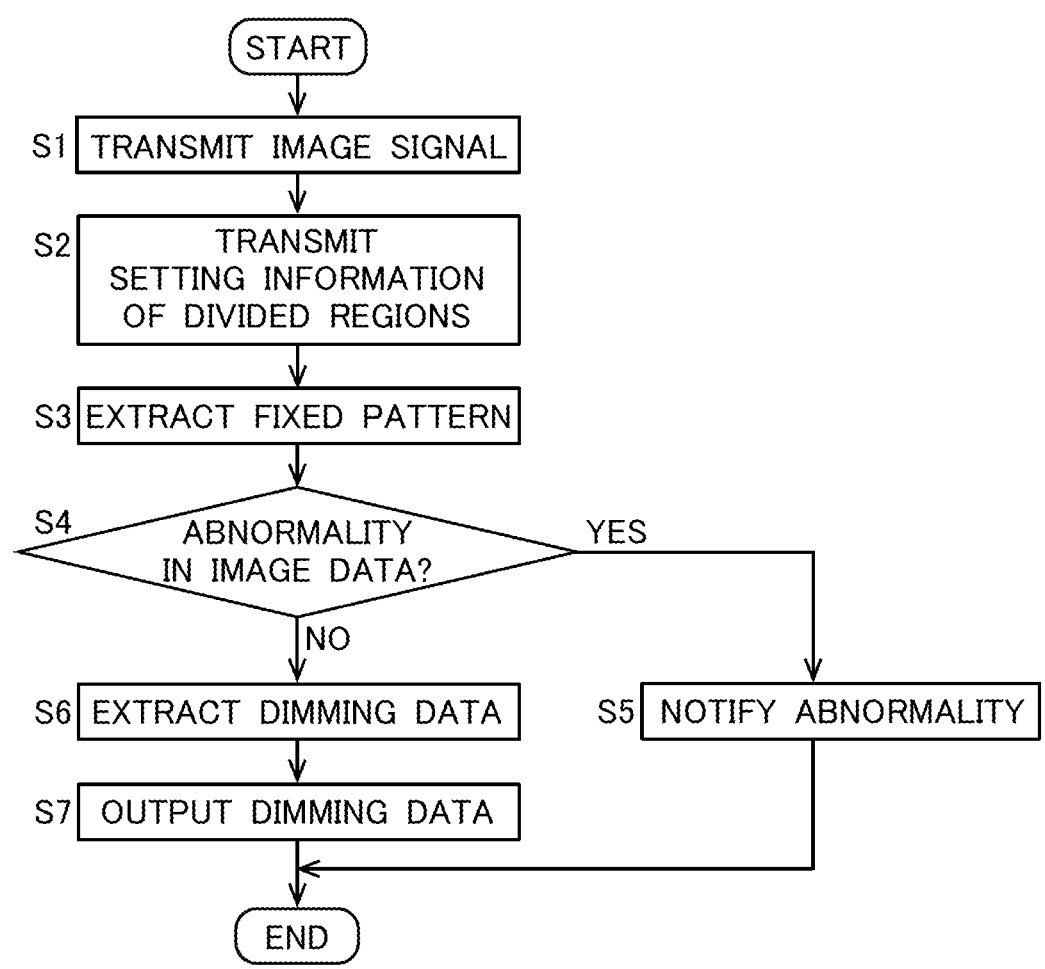
FIG. 5 is a flow chart showing a dimming-data related operation of the image display system according to the first embodiment.

FIG. 5 is a flow chart showing a dimming-data related operation of the image display system 1A.

The image signal transmission unit 20 of the image signal transmission device 2 transmits an image signal to the image signal reception unit 31 of the image signal reception device 3 (step S1). In this embodiment, the image signal transmission unit 20 includes the fixed pattern information and the dimming data in the image signal. In this embodiment, the fixed pattern information indicates in order whether each divided region is a light-on region or a light-off region. Accordingly, in the example shown in FIG. 4A, the fixed pattern information indicates, in order from the divided regions R1 to R32, (light-off, light-off, light-off, light-off, light-off, light-on, light-on, light-off, light-on, light-on, light-off, light-on, light-on, light-off, light-off, light-off, light-off, light-on, light-off, light-on, light-on, light-off, light-on, light-off, light-off, light-off, light-off, light-off, light-on, light-on, light-off, light-off, light-off). For example, a digital value '1' may be assigned to 'light-on', and a digital value '0' may be assigned to 'light-off' such that the information indicates (00000110110110000101101000011000). In this embodiment, the image signal is a low voltage differential signaling (LVDS) signal. Note that the image signal may instead be an embedded display port (eDP) signal, an open LDI (oLDI) signal, or an MipiDSI signal.

Figure 6:
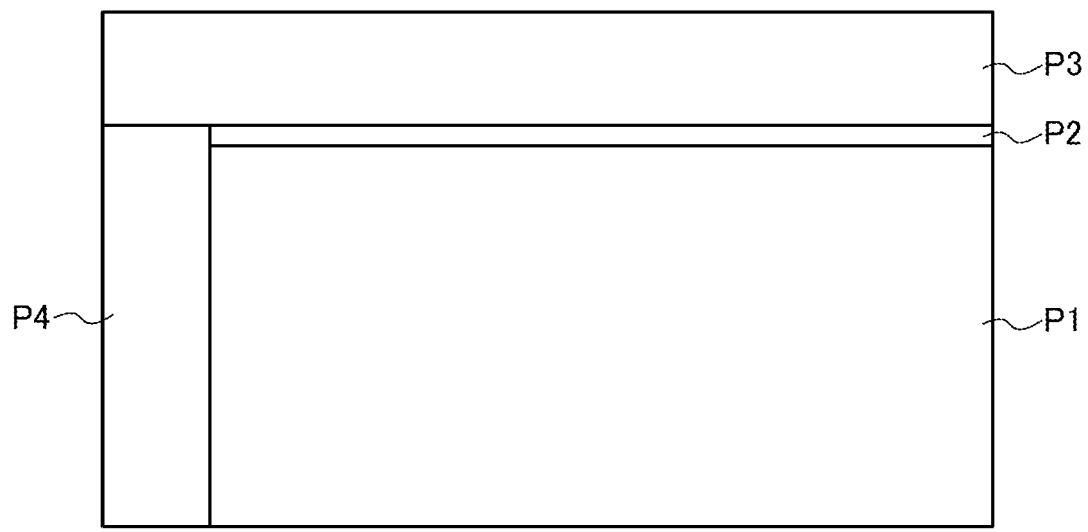
FIG. 6 is a schematic diagram showing a frame configuration of an image signal.

Each frame of the image signal includes, as shown in FIG. 6, a display region portion P1 serving as a display region, a non-display region portion P2 serving as a non-display region, a vertical blanking region portion P3 serving as a vertical blanking region, and a horizontal blanking region portion P4 serving as a horizontal blanking region. The number of lines in the non-display region portion P2 is smaller than that in the vertical blanking region portion P3 by the number of lines in the horizontal blanking region portion P4. The non-display region portion P2 has four lines, for example.

The image signal transmission unit 20 stores image data in the display region portion P1, and stores, in the non-display region portion P2, fixed pattern information and dimming data output from the transmission unit 24. The image signal transmission unit 20 does not necessarily need to store the fixed pattern information and the dimming data in each frame. Note that, for exact synchronization with the image data, the image signal transmission unit 20 may store the fixed pattern information and the dimming data in each frame.

In step S2 following step S1, the image signal transmission unit 20 of the image signal transmission device 2 transmits setting information of divided regions to the image signal reception unit 31 of the image signal reception device 3. In this embodiment, the image signal transmission unit 20 includes the setting information of the divided regions in the image signal. The setting information of the divided regions includes the number of divisions (32 in the example shown in FIG. 4A) and position information of each divided region (information regarding to which pixel in the image data each divided region corresponds).

In step S3 following step S2, the local dimming setting extraction unit 32 extracts the fixed pattern information from the image signal.

In step S4 following step S3, the abnormality detection unit 33 detects whether or not there is an abnormality in the image data. In this embodiment, the abnormality detection unit 33 detects whether or not there is an abnormality with respect to only image data corresponding to a light-on region. This is because even if there is an abnormality in image data corresponding to a light-off region, it has no effect on a display image. However, unlike in this embodiment, the abnormality detection unit 33 may detect whether or not there is an abnormality with respect to only image data corresponding to a light-off region, or may detect whether or not there is an abnormality with respect to both image data corresponding to a light-on region and image data corresponding to a light-off region. Note that, in detecting whether or not there is an abnormality in image data corresponding to a light-on region and in image data corresponding to a light-off region, the abnormality detection unit 33 may use different methods between the abnormality detection with respect to image data corresponding to a light-on region and the abnormality detection with respect to image data corresponding to a light-off region. For example, in a case of analog image data, which will be described later, the abnormality detection unit 33 may determine that image data corresponding to a light-on region is normal when a parameter regarding that image data corresponding to a light-on region is equal to or more than a threshold value, and may determine that image data corresponding to a light-off region is normal when a parameter regarding that image data corresponding to the light-off region is less than a threshold value.

In a case of digital image data, examples of adoptable methods include a method in which CRC data is included in the image data and the abnormality detection unit 33 performs abnormality detection by utilizing the CRC data, and a method in which the abnormality detection unit 33 calculates a total value of RGB data of a predetermined light-on region and performs abnormality detection based on a result of comparison between the total value and an expected value.

In the case of analog image data, examples of adoptable methods include a method in which the abnormality detection unit 33 obtains a histogram of pixel brightness of a predetermined light-on region, obtains a parameter (for example, a mean value, a medium value, etc.) based on the histogram, and performs abnormality detection based on the parameter. In the method in which the abnormality detection unit 33 obtains a histogram of pixel brightness of a predetermined light-on period, obtains a parameter (for example, a mean value, a medium value, etc.) based on the histogram, and performs abnormality detection based on the parameter, it is only the pixel brightness that is checked, and thus the method is an abbreviated method of abnormality detection.

In a case where an abnormality is detected in the image data (YES in step S4), the abnormality detection unit 33 notifies the image signal transmission device 2 of the abnormality, and the image data is not output to the liquid crystal display device 4 (step S5). The method of abnormality notification is not particularly limited, and in an exemplary method, with the image signal transmission unit 20 including a serializer and the image signal reception unit 31 including a deserializer, the abnormality detection unit 33 notifies the image signal transmission device 2 of the abnormality via I2C communication using a back channel between the serializer and the deserializer. The serializer converts the image signal using its unique algorithm, and sends the converted image signal to the deserializer. The deserializer performs, with respect to the received image signal, conversion reverse to the conversion performed by the serializer. If the abnormality notification using the I2C communication via the back channel between the serializer and the deserializer is adopted, there is no need of providing a new communication wire between the image signal transmission device 2 and the image signal reception device 3 for abnormality notification. Note that the image signal reception device 3 may monitor the liquid crystal display device 4 for presence/absence of an abnormality, and may use the I2C communication via the backchannel between the serializer and the deserializer or in-vehicle communication such as LIN, CAN, MOST, CXPI, or Ethernet to notify the image signal transmission device 2 of a monitoring result.

In contrast, in a case where no abnormality has been detected in the image data (NO in step S4), the abnormality detection unit 33 outputs the image data to the liquid crystal display device 4, and the local dimming setting extraction unit 32 extracts dimming data from the image signal (step S6).

In step S7 following step S6, the mapping setting unit 34 performs mapping of the dimming data having been extracted in step S6 to a light-on region or light-on regions specified by the fixed pattern information. Further, in step S7, the dimming data conversion unit 35 adds, to an output of the mapping setting unit 34, the dimming data (the lowest intensity value) corresponding to a light-off region or light-off regions of the backlight unit 41, to thereby convert the output of the mapping setting unit 34 into dimming data to be output to the liquid crystal display device 4. Moreover, in step S7, the dimming data conversion unit 35 outputs the converted dimming data to the second driving unit 43 of the liquid crystal display device 4.

In the image display system 1A, the processing of an image signal and the processing of dimming data are completed in the signal processing unit 30, and this facilitates the construction of the system.

Second Embodiment

Figure 7:
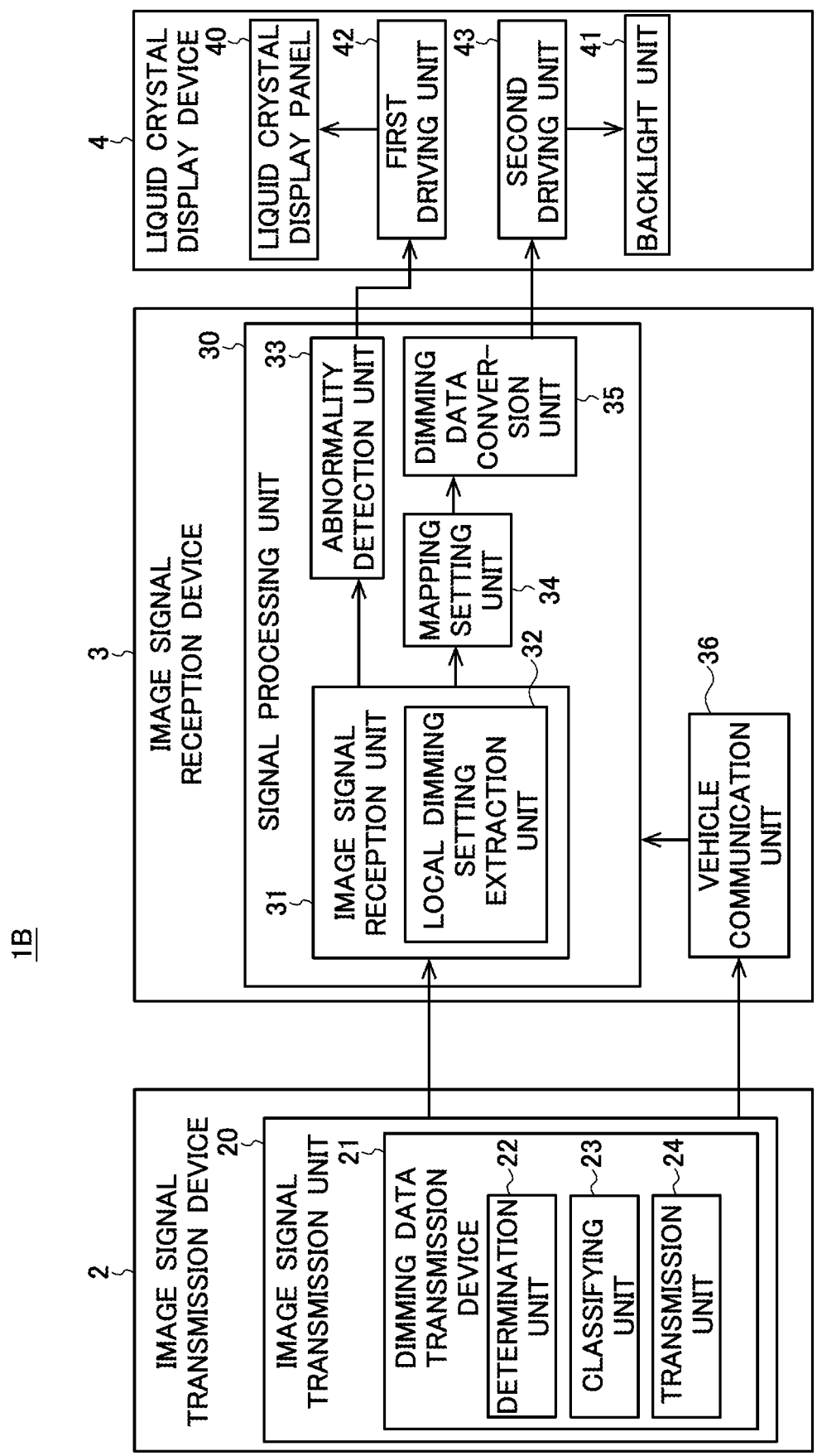
FIG. 7 is a block diagram showing a configuration of an image display system according to a second embodiment.

FIG. 7 is a block diagram showing a configuration of an image display system 1B according to the second embodiment (hereinafter, abbreviated as "the image display system 1B"). In FIG. 7, such parts as are identical to their counterparts in FIG. 3 are given the same reference signs as their counterparts in FIG. 3.

The image display system 1B is different from the image display system 1A in that the transmission unit 24 transmits, via the in-vehicle communication network, dimming data to the vehicle communication unit 36 of the image signal reception device 3. In other respects, the image display system 1B is basically similar in configuration to the image display system 1A.

Accordingly, a dimming-data related operation of the image display system 1B can be illustrated by the same flow chart of FIG. 5 as the dimming-data related operation of the image display system 1A. However, in the image display system 1B, in step S6, the abnormality detection unit 33 outputs image data to the liquid crystal display device 4, and the local dimming setting extraction unit 32 extracts dimming data from information received by the vehicle communication unit 36.

Here, unlike in this embodiment, the transmission unit 24 may be provided at a location away from the determination unit 22 and the classifying unit 23. For example, the liquid crystal display device 4 may be provided with an illuminance sensor and the illuminance sensor may function as the transmission unit 24. The illuminance sensor may generate dimming data in accordance with a detected illuminance around the liquid crystal display device 4, and transmit the dimming data via the in-vehicle communication network to the vehicle communication unit 36 of the image signal reception device 3.

Third Embodiment

Figure 8:
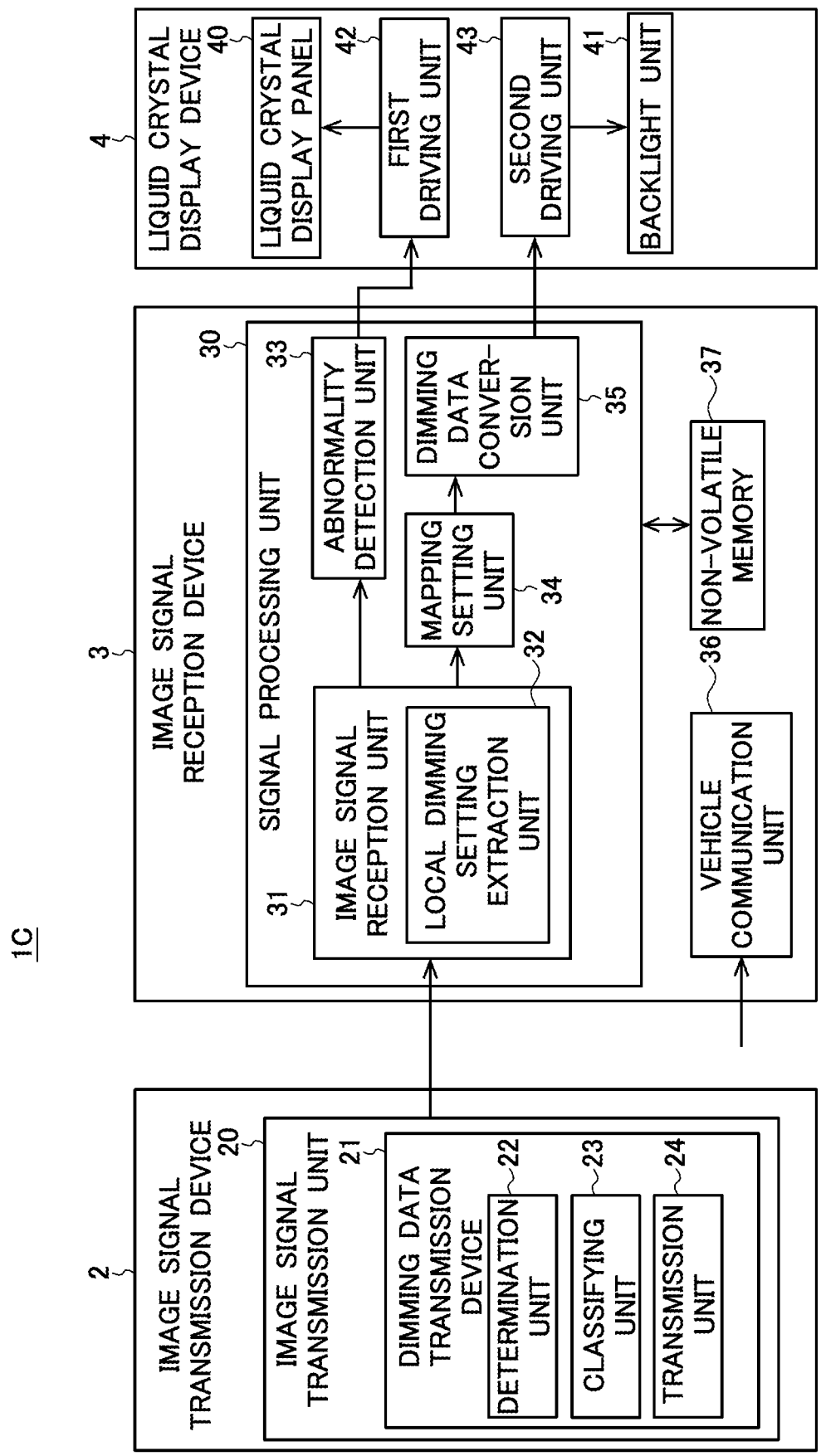
FIG. 8 is a block diagram showing a configuration of an image display system according to a third embodiment.

FIG. 8 is a block diagram showing a configuration of an image display system 1C according to a third embodiment (hereinafter, abbreviated as "the image display system 1C"). In FIG. 8, such parts as are identical to their counterparts in FIG. 3 are given the same reference signs as their counterparts in FIG. 3.

The image display system 1C is different from the image display system 1A in that the image signal transmission unit 20 sends identification information of a fixed pattern as fixed pattern information. The image display system 1C is further different from the image display system 1A in that the mapping setting unit 34 retrieves, from a non-volatile memory 37, an arrangement of fixed pattern. In other respects, the image display system 1C is basically similar in configuration to the image display system 1A.

In the image display system 1C, for example, the image signal transmission unit 20 sends, as fixed pattern information, information to the effect that a first fixed pattern is to be selected. The non-volatile memory 37 has stored therein the first fixed pattern and information indicating, in order from the divided regions R1 to R32, (light-off, light-off, light-off, light-off, light-off, light-on, light-on, light-off, light-on, light-on, light-off, light-on, light-on, light-off, light-off, light-off, light-off, light-on, light-off, light-on, light-on, light-off, light-on, light-off, light-off, light-off, light-off, light-on, light-on, light-off, light-off, light-off), in such a manner that the first fixed pattern and this information are linked to each other. If the non-volatile memory 37 has stored therein information regarding a plurality of fixed patterns beforehand, the image display system 1C can change the fixed pattern.

A dimming-data related operation of the image display system 1C can be illustrated by the same flow chart of FIG. 5 as the dimming-data related operation of the image display system 1A. However, in the image display system 1C, in step S3, the local dimming setting extraction unit 32 extracts, from an image signal, fixed pattern information, and the mapping setting unit 34 retrieves information linked to the fixed pattern information from the non-volatile memory 37.

In this embodiment, as compared with the first and second embodiments, it is possible to reduce the data amount of fixed pattern information which is sent from the image signal transmitter 20 to the signal processor 30.

Fourth Embodiment

Figure 9:
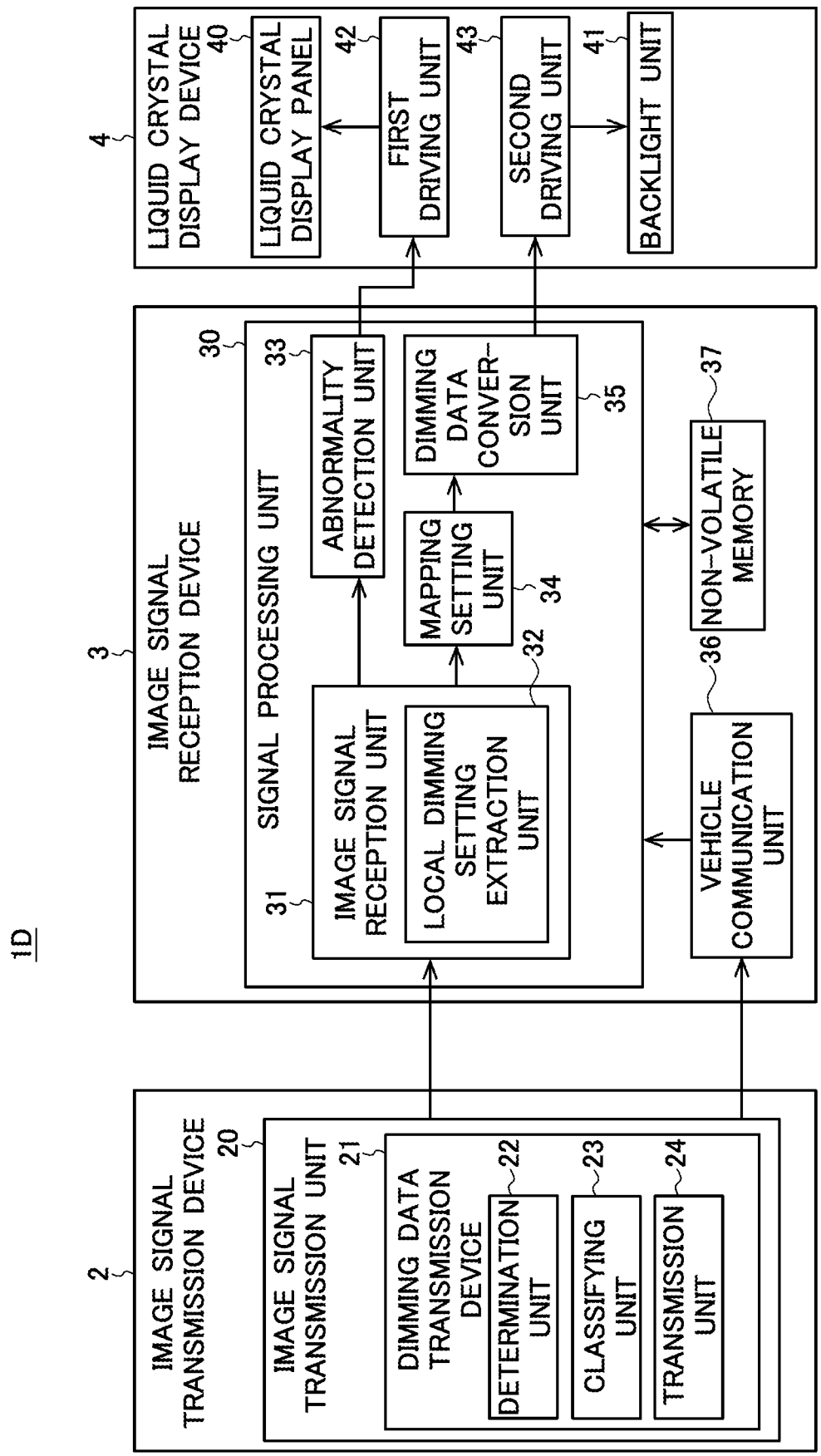
FIG. 9 is a block diagram showing a configuration of an image display system according to a fourth embodiment.

FIG. 9 is a block diagram showing a configuration of an image display system 1D according to a fourth embodiment (hereinafter, abbreviated as "the image display system 1D"). In FIG. 9, such parts as are identical to their counterparts in FIG. 3 are given the same reference signs as their counterparts in FIG. 3.

The image display system 1D is different from the image display system 1A in that the transmission unit 24 transmits dimming data via the in-vehicle communication network to the vehicle communication unit 36 of the image signal reception device 3, and that the image signal transmission unit 20 sends identification information of a fixed pattern as fixed pattern information. The image display system 1D is further different from the image display system 1A in that the mapping setting unit 34 retrieves an arrangement of a fixed pattern from the non-volatile memory 37. In other respects, the image display system 1D is basically similar in configuration to the image display system 1A. That is, it can be said that the image display system 1D has a configuration obtained by combining the image display system 1B and the image display system 1C.

A dimming-data related operation of the image display system 1D can be illustrated by the same flow chart of FIG. 5 as the dimming-data related operation of the image display system 1A. However, in the image display system 1D, in step S3, the local dimming setting extraction unit 32 extracts fixed pattern information from an image signal, and the mapping setting unit 34 retrieves, from the non-volatile memory 37, information linked to the fixed pattern information. Further, in the image display system 1D, in step S6, the abnormality detection unit 33 outputs image data to the liquid crystal display device 4, and the local dimming setting extraction unit 32 extracts dimming data from information received by the vehicle communication unit 36.

Here, unlike in this embodiment, the transmission unit 24 may be provided at a location away from the determination unit 22 and the classifying unit 23. For example, the liquid crystal display device 4 may be provided with an illuminance sensor and the illuminance sensor may function as the transmission unit 24. The illuminance sensor may generate dimming data in accordance with a detected illuminance around the liquid crystal display device 4, and transmit the dimming data via the in-vehicle communication network to the vehicle communication unit 36 of the image signal reception device 3.

Fifth Embodiment

Figure 10:
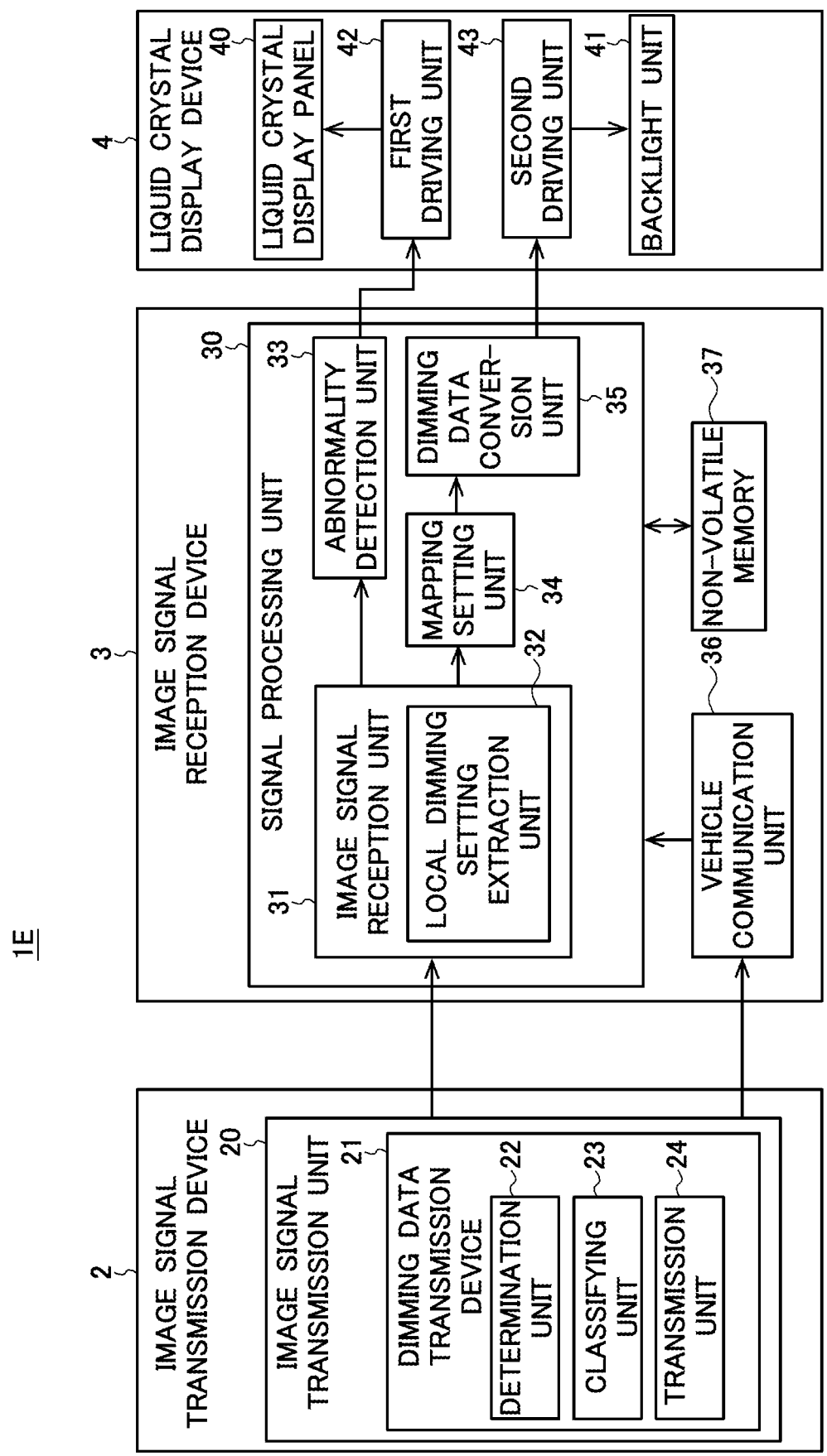
FIG. 10 is a block diagram showing a configuration of an image display system according to a fifth embodiment.

FIG. 10 is a block diagram showing a configuration of an image display system 1E according to a fifth embodiment (hereinafter, abbreviated as "the image display system 1E"). In FIG. 10, such parts as are identical to their counterparts in FIG. 3 are given the same reference signs as their counterparts in FIG. 3.

The image display system 1E is different from the image display system 1A in that the transmission unit 24 transmits dimming data via the in-vehicle communication network to the vehicle communication unit 36 of the image signal reception device 3. The image display system 1E is further different from the image display system 1A in that the transmission unit 24 transmits identification information of a fixed pattern as fixed pattern information via the in-vehicle communication network to the vehicle communication unit 36 of the image signal reception device 3. The image display system 1E is still further different from the image display system 1A in that the mapping setting unit 34 retrieves an arrangement of a fixed pattern from the non-volatile memory 37. In other respects, the image display system 1E is basically similar in configuration to the image display system 1A.

A dimming-data related operation of the image display system 1E can be illustrated by the same flow chart of FIG. 5 as the dimming-data related operation of the image display system 1A. However, In the image display system 1E, in step S3, the local dimming setting extraction unit 32 extracts fixed pattern information from information received by the vehicle communication unit 36, and the mapping setting unit 34 retrieves, from the non-volatile memory 37, information linked to the fixed pattern information. Further, in the image display system 1E, in step S6, the abnormality detection unit 33 outputs image data to the liquid crystal display device 4, and the local dimming setting extraction unit 32 extracts dimming data from the information received by the vehicle communication unit 36.

In this embodiment, as compared with the first to fourth embodiments, it is possible to reduce the data amount of image signal which is sent from the image signal transmission unit 20 to the signal processing unit 30.

Sixth Embodiment

Figure 11:
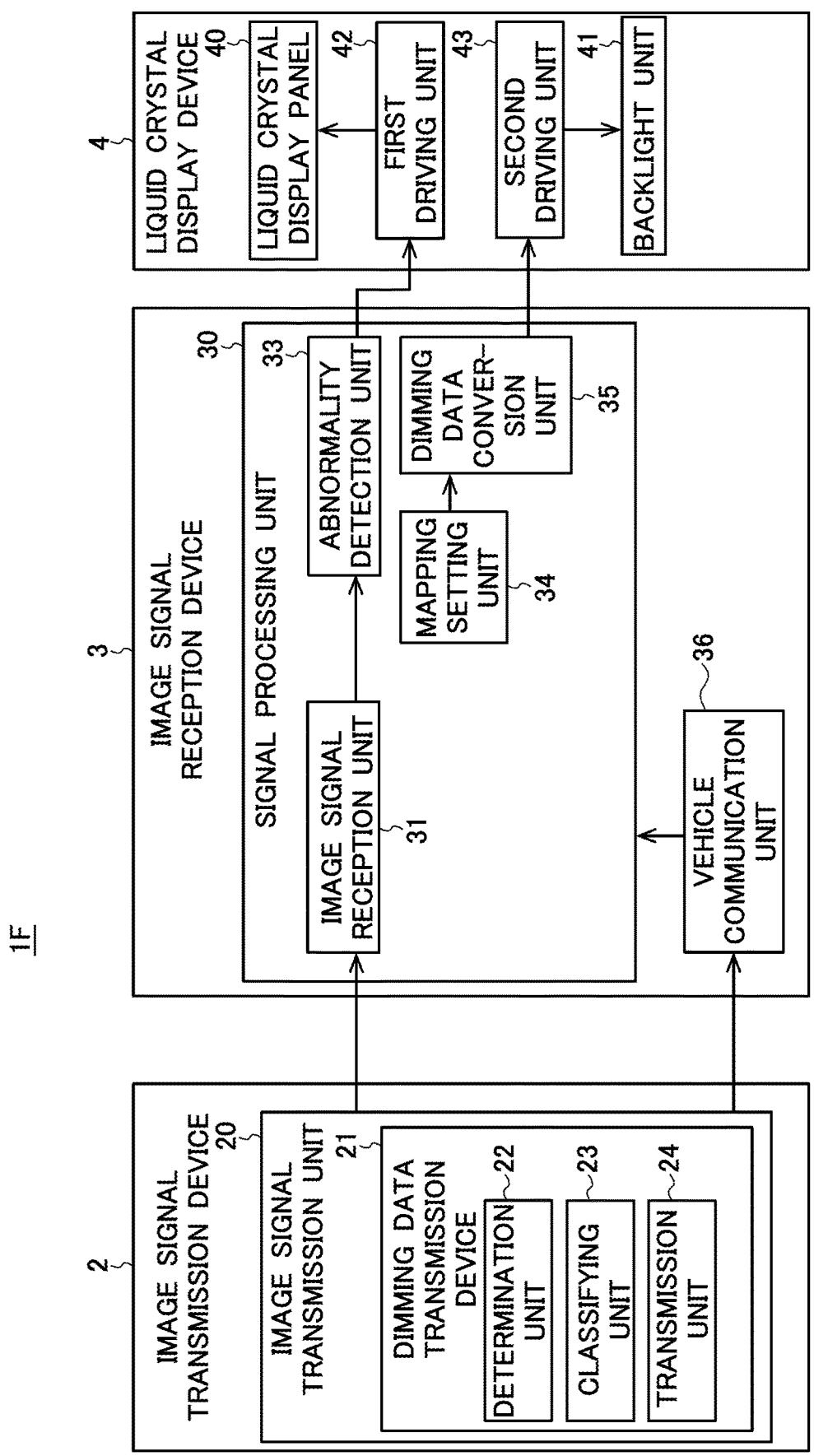
FIG. 11 is a block diagram showing a configuration of an image display system according to a sixth embodiment.

FIG. 11 is a block diagram showing a configuration of an image display system 1F according to a six embodiment (hereinafter, abbreviated as "the image display system 1F"). In FIG. 11, such parts as are identical to their counterparts in FIG. 10 are given the same reference signs as their counterparts in FIG. 10.

The image display system 1F is different from the image display system 1E in that the vehicle communication unit 36 has the function of the local dimming setting extraction unit 32 of the image display system 1E. In other respects, the image display system 1F is basically similar in configuration to the image display system 1E.

A dimming-data related operation of the image display system 1F can be illustrated by the same flow chart of FIG. 5 as the dimming-data related operation of the image display system 1A. However, in the image display system 1F, in step S3, the vehicle communication unit 36 extracts fixed pattern information from information that the vehicle communication unit 36 itself has received, and the mapping setting unit 34 retrieves, from the non-volatile memory 37, information linked to the fixed pattern information. Further, in the image display system 1F, in step S6, the abnormality detection unit 33 outputs image data to the liquid crystal display device 4, and the vehicle communication unit 36 extracts dimming data from information that the vehicle communication unit 36 itself has received.

In this embodiment, as compared with the first to fourth embodiment, it is possible to reduce the data amount of image signal which is sent from the image signal transmission unit 20 to the signal processing unit 30.

Seventh Embodiment

Figure 12:
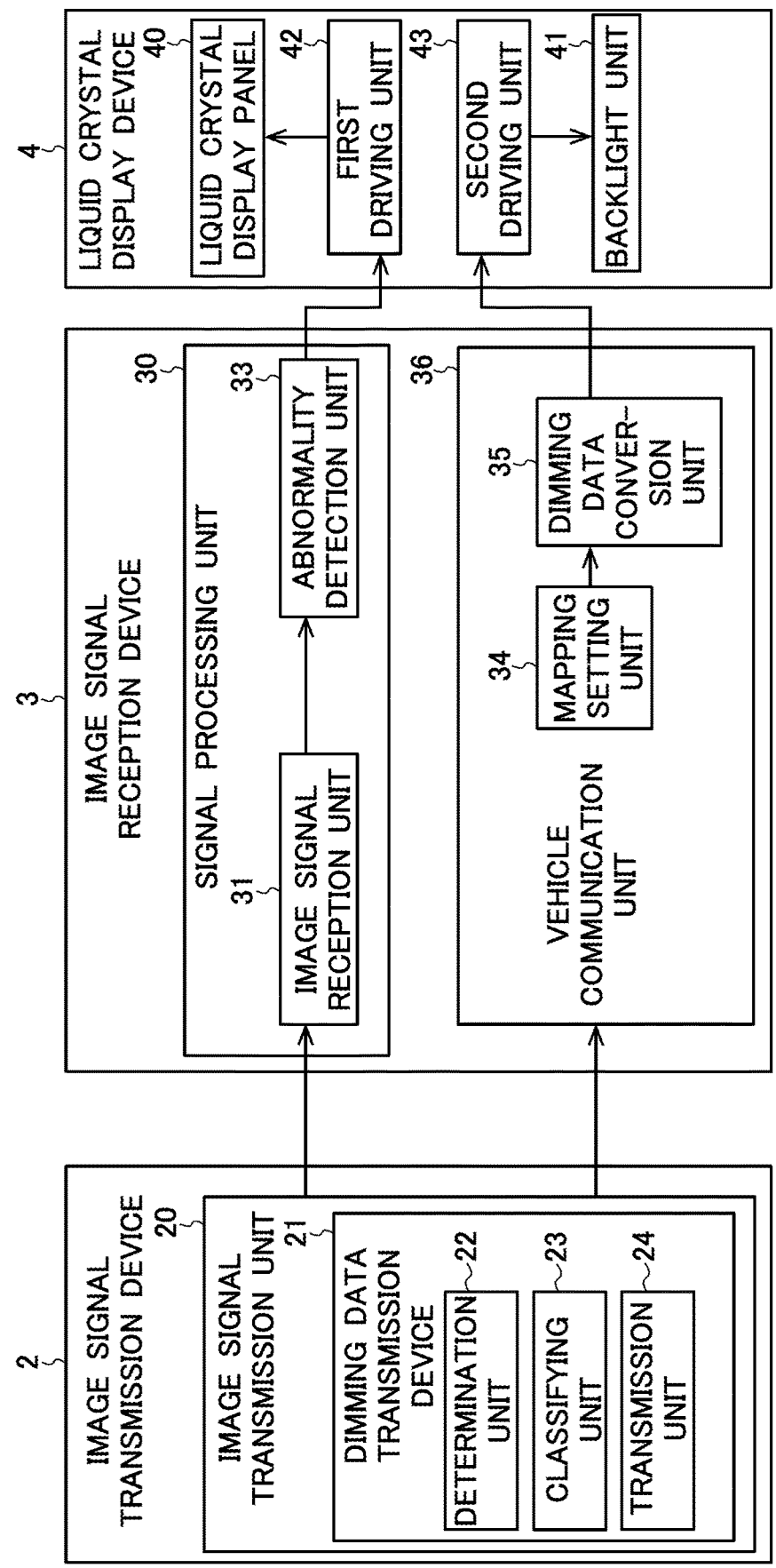
FIG. 12 is a block diagram showing a configuration of an image display system according to a seventh embodiment.

FIG. 12 is a block diagram showing a configuration of an image display system 1G according to a seventh embodiment (hereinafter, abbreviated as "the image display system 1G"). In FIG. 12, such parts as are identical to their counterparts in FIG. 11 are given the same reference signs as their counterparts in FIG. 11.

The image display system 1G is different from the image display system 1F in that the vehicle communication unit 36 includes the mapping setting unit 34 and the dimming data conversion unit 35. In other respects, the image display system 1G is basically similar in configuration to the image display system 1F.

A dimming-data related operation of the image display system 1G can be illustrated by the same flow chart of FIG. 5 as the dimming-data related operation of the image display system 1A. However, in the image display system 1G, in step S3, the vehicle communication unit 36 extracts fixed pattern information from information that the vehicle communication unit 36 itself has received, and the mapping setting unit 34 in the vehicle communication unit 36 retrieves, from the non-volatile memory 37, information linked to the fixed pattern information. Further, in the image display system 1G, in step S6, the abnormality detection unit 33 outputs image data to the liquid crystal display device 4, and the vehicle communication unit 36 extracts dimming data from information that the vehicle communication unit 36 itself has received.

In this embodiment, as compared with the first to fourth embodiment, it is possible to reduce the data amount of image signal which is sent from the image signal transmission unit 20 to the signal processing unit 30.

Further, in the image display system 1G, the processing of dimming data is completed in the vehicle communication unit 36, and this facilitates the construction of the system.

<Notes>

Other than the embodiments described above, various technical features disclosed in this specification can be variously modified within the scope without deviating from the spirit of the technical invention.

For instance, in the embodiments described above, the backlight unit 41 of the liquid crystal display device 4 is the illumination device, but the illumination device may be something other than the backlight unit 41 of the liquid crystal display device 4. The dimming data transmission devices described above may be used in a case, for example, where an LED lamp provided on the outside of a vehicle is used as an adaptive driving beam (ADB) lamp, an animation lamp for displaying animation of an arrow mark, an emoticon, and the like, etc.

As has been described above, a dimming data transmission device includes a determination unit configured to determine whether each of a plurality of divided regions, into which a lightable region of an illumination device is divided, is a light-on region or a light-off region, and a transmission unit configured to transmit dimming data to dim only such a divided region of the divided regions as is serving as the light-on region (a first configuration).

With the dimming data transmission device having the first configuration, the data amount of dimming data can be reduced significantly.

The dimming data transmission device having the first configuration described above may further include a classifying unit configured to classify all such ones of the divided regions as are each serving as the light-on region into a number of groups, the number being smaller than a number of all the such ones of the divided regions as are each serving as the light-on region. Here, the dimming data is data that allows dimming of the groups individually on a group-by-group basis (a second configuration).

With the dimming data transmission device having the second configuration, the smaller the number of the groups, the more the data amount of dimming data can be reduced.

In the dimming data transmission device having the second configuration described above, the number of the groups may be one (a third configuration).

With the dimming data transmission device having the third configuration, since the number of the groups is one, the data amount of dimming data can be reduced the most.

In the dimming data transmission device having any one of the first to third configurations described above, the illumination device may be a backlight unit of a liquid crystal display device (a fourth configuration).

In the dimming data transmission device having the fourth configuration described above, the transmission unit may be configured to perform signal processing of storing the dimming data in a non-display region portion of an image signal including a display region portion, the non-display region portion, and a blanking region portion, and to transmit the image signal having been subjected to the signal processing (a fifth configuration).

With the dimming data transmission device having the fifth configuration, it is possible to make effective use of a non-display region portion of an image signal to transmit the dimming data.

An image display system disclosed herein includes an image signal transmission device including the dimming data transmission device having the fourth or fifth configuration described above and configured to transmit dimming data and an image signal, an image signal reception device configured to receive the dimming data and the image signal transmitted from the image signal transmission device, a liquid crystal display panel, and a backlight unit configured to irradiate the liquid crystal display panel with light. Here, the liquid crystal display panel is configured to display an image based on the image signal received by the image signal reception device, and the backlight unit is configured to emit light based on the dimming data received by the image signal reception device (a sixth configuration).

With the image display system having the sixth configuration, the data amount of dimming data can be reduced significantly.

In the image display system having the sixth configuration described above, preferably, the image signal reception device includes an abnormality detection unit configured to detect an abnormality only in such image data in the image signal as corresponds to the light-on region (a seventh configuration).

In the image display system having the seventh configuration, such an abnormality as will not affect a display image can be left undetected.

In the image display system having the sixth configuration described above, preferably, the image signal reception device includes an abnormality detection unit configured to detect an abnormality in only such image data in the image signal as corresponds to the light-off region (an eighth configuration).

In the image display system having the eighth configuration, such an abnormality as will not affect a display image can be detected.

In the image display system having the sixth configuration described above, preferably, the image signal reception device includes an abnormality detection unit configured to detect an abnormality using different methods between in such image data in the image signal as corresponds to the light-on region and in such image data in the image signal as corresponds to the light-off region (a ninth configuration).

In the image display system having the ninth configuration, an abnormality can be appropriately detected both in such image data as corresponds to the light-on region and in such image data as corresponds to the light-off region.

In the dimming data transmission device having any one of the first to third configurations described above, preferably, the illumination device is provided on an outside of a vehicle (a tenth configuration).

The dimming data transmission device having the tenth configuration, with which the data amount of dimming data can be reduced significantly, is preferably used particularly in a case where an illumination device is used as an ADB lamp, an animation lamp, or the like.

A vehicle disclosed herein includes the dimming data transmission device having any one of the first to fifth and tenth configurations described above, or the image display system having any one of the sixth to ninth configurations described above (an eleventh configuration).

In the vehicle having the eleventh configuration, the data amount of dimming data can be reduced significantly.

REFERENCE SIGNS LIST

1A~1G image display systems according to the first to seventh embodiments
2 image signal transmission device
20 image signal transmission unit 21 dimming data transmission device
22 determination unit
23 classifying unit
24 transmission unit
3 image signal reception device
30 signal processing unit
31 image signal reception unit
32 local dimming setting extraction unit
33 abnormality detection unit
34 mapping setting unit
35 dimming data conversion unit
36 vehicle communication unit
37 non-volatile memory
4 liquid crystal display device
40 liquid crystal display panel
41 backlight unit
42 first driving unit
43 second driving unit
101 vehicle
102 CID
103 instrument cluster
104L, 104R display device
105 HUD
P1 display region portion
P2 non-display region portion
P3 vertical blanking region portion
P4 horizontal blanking region portion
R1-R32 divided region

The invention claimed is:

1. A dimming data transmission device, comprising a first processor configured to determine whether each of a plurality of divided regions, into which a lightable region of an illumination device is divided, is a light-on region or a light-off region and configured to transmit dimming data to dim only such a divided region of the divided regions as is serving as the light-on region,
wherein the illumination device is a backlight unit of a liquid crystal display device, and
the first processor is configured:
to perform signal processing of storing the dimming data in a non-display region portion of an image signal including a display region portion, the non-display region portion, and a blanking region portion; and
to transmit the image signal having been subjected to the signal processing.

2. The dimming data transmission device according to claim 1,
wherein the first processor is configured to classify all such ones of the divided regions within the entire illumination device as are each serving as the light-on region into groups, the total number of groups being less than the total number of all the such ones of the divided regions within the entire illumination device as are each serving as the light-on region, and
the dimming data is data that allows dimming of the groups individually on a group-by-group basis.

3. The dimming data transmission device according to claim 2, wherein the total number of the groups is one.

4. An image display system, comprising: a transmitter including the dimming data transmission device according to claim 1, and configured to transmit dimming data and an image signal; a receiver configured to receive the dimming data and the image signal transmitted from the transmitter; a liquid crystal display panel; and a backlight unit configured to irradiate the liquid crystal display panel with light, wherein the liquid crystal display panel is configured to display an image based on the image signal received by the receiver, and the backlight unit is configured to emit light based on the dimming data received by the receiver.

5. The image display system according to claim 4, wherein the receiver includes a second processor configured to detect an abnormality only in such image data in the image signal as corresponds to the light-on region.

6. The image display system according to claim 4, wherein the receiver includes a second processor configured to detect an abnormality only in such image data in the image signal as corresponds to the light-off region.

7. The image display system according to claim 4, wherein the receiver includes a second processor configured to detect an abnormality using different methods between in such image data in the image signal as corresponds to the light-on region and in such image data in the image signal as corresponds to the light-off region.

8. A vehicle, comprising:
the image display system according to claim 4.

9. A vehicle, comprising:
the dimming data transmission device according to claim 1.

* * * * *